United States Patent
Sturkenboom et al.

(10) Patent No.: US 6,923,994 B2
(45) Date of Patent: Aug. 2, 2005

(54) PROCESS FOR PRODUCING BREAD WITH EXTENDED SHELF LIFE, BREAD DOUGH AND BREAD IMPROVER COMPOSITION FOR PRODUCING SUCH BREAD

(75) Inventors: Marcellus Gerardus Sturkenboom, Houten (NL); Paul David de Levita, Driebergen-R (NL); Antonius Adrianus Gerardus von Duijnhoven, Wagenberg (NL)

(73) Assignee: Bakery Technology Centre, B.V., Wagenberg (NL)

( * ) Notice: Subject to any disclaimer, the term of this patent is extended or adjusted under 35 U.S.C. 154(b) by 52 days.

(21) Appl. No.: 10/215,257

(22) Filed: Aug. 8, 2002

(65) Prior Publication Data

US 2004/0028773 A1 Feb. 12, 2004

(51) Int. Cl.$^7$ ................................................ A21D 8/04
(52) U.S. Cl. ...................... 426/20; 426/28; 426/549; 426/653
(58) Field of Search ............... 426/20, 28, 52, 426/63, 64, 549, 555, 653

(56) References Cited

U.S. PATENT DOCUMENTS

| | | | |
|---|---|---|---|
| 4,567,046 A | | 1/1986 | Inoue et al. |
| 4,851,234 A | * | 7/1989 | Chung ........................... 426/7 |
| 6,083,538 A | * | 7/2000 | Plijter et al. ................... 426/20 |
| 6,110,508 A | * | 8/2000 | Olesen et al. .................. 426/20 |
| 6,251,444 B1 | * | 6/2001 | Van Eijk et al. ............... 426/20 |
| 6,270,813 B1 | * | 8/2001 | Nielsen et al. ................. 426/20 |
| 6,365,204 B1 | | 4/2002 | Spendler et al. |
| 6,406,723 B1 | * | 6/2002 | Soe et al. ....................... 426/18 |
| 6,558,715 B1 | * | 5/2003 | Rey et al. ....................... 426/20 |
| 2003/0180418 A1 | | 9/2003 | Rey et al. |

FOREIGN PATENT DOCUMENTS

| | | | |
|---|---|---|---|
| EP | 0 585 988 | * | 3/1994 |
| WO | 91/04669 | * | 4/1991 |
| WO | 99/53769 | * | 10/1999 |

OTHER PUBLICATIONS

"New Enzymes for the Baking Industry", Food Tech Europe, Mar./Apr. 1996, pp. 60–64.*

Maeda et al., "Effects of Mutant Thermostable α-Amylases on Rheological Properties of Wheat Dough and Bread", *Cereal Chemistry*, 80(6):722–727(2003).

* cited by examiner

*Primary Examiner*—Keith Hendricks
(74) *Attorney, Agent, or Firm*—Hoffman & Baron, LLP

(57) ABSTRACT

The present invention relates to a process for producing bread, said process being suitable for obtaining a bread having a shelf-life of at least seven days, the process comprising providing a dough based upon a flour and adding a specific enzyme mixture. The present invention further relates to a bread having a shelf-life of at least seven days and to an enzyme mixture for use in obtaining such a bread.

39 Claims, No Drawings

PROCESS FOR PRODUCING BREAD WITH EXTENDED SHELF LIFE, BREAD DOUGH AND BREAD IMPROVER COMPOSITION FOR PRODUCING SUCH BREAD

BACKGROUND OF THE INVENTION

The present invention relates to a process for producing bread. The present invention also relates to a bread dough which can be used in the process according to the present invention. Further, the present invention relates to a bread improver composition which can be used in the process for producing bread according to the present invention and to a bread with a long shelf-life.

During storage from the time of baking the bread to the time of consumption the softness of bread decreases and the organoleptic properties deteriorate so that the quality of the bread does not longer meet the standard requirements. This undesirable change in the quality of the bread is described by the term staling. The staling process is characterized by an increase in the firmness and a decrease in the elasticity of the crumb of the bread. Also the organoleptic properties of the crust rapidly diminish upon prolonged storage of the packaged bread at ambient conditions.

In order to obtain bread with a shelf life of 3–5 days and a bread quality which meets the standard requirements, it has been proposed to use emulsifiers in the manufacturing process, such as monoglycerides or calcium stearoyl lactylate, to improve dough strength and crumb softness and to remedy staling. If the emulsifiers are omitted, however, usually at best bread having an average shelf life of at most 3 days can be obtained. Moreover the quality of the bread without emulsifiers is rapidly deteriorating upon storage. It is advantageous, however, to delete the emulsifiers, since they are considered to be chemical additives by the public.

Therefore there is still a great need for a bread production process on commercial factory scale in which preferably no emulsifiers are used and yet leads to bread with a long shelf life and which bread also after long storage meets the standard quality requirements.

It has also been proposed to increase the levels of fat or shortening used in the manufacture of bread so as to achieve a longer shelf life, but the amount to be used to achieve appreciable benefits is rather high, which is unacceptable from a health point of view. Furthermore the use of thickening agents to increase the shelf life of commercially produced bread has been proposed, but this use leads to inferior organoleptic quality of the bread.

Finally it has been proposed to retard the staling of bread without adversely affecting the required organoleptic properties by adding enzymes or enzyme mixtures during the commercial bread production process. It has been reported that thus the organoleptic properties of the bread can be improved.

Thus, it has been proposed in EP-A-0 585 988 (Gist-Brocades NV) to use a mixture of lipase, hemicellulase and amylase, preferably in combination with shortening, to avoid the use of emulsifiers in the bread manufacture process. In the examples given in this patent, the obtained bread is stored for 3 days in polyethylene bags at room temperature. Nowhere in this patent a shelf life of longer than 3 days has been suggested or indicated however. Only changes in crumb firmness are indicated, but there is no indication or suggestion of the organoleptic and further physical properties of the bread after 3 days storage.

Furthermore it has been proposed in WO 99-53769 (Novonordisk AS) to use a combination of an anti-staling amylase (such as maltogenic alpha-amylase (Novamyl)) to reduce the rate of crumb firming during storage and a phospholipase to improve the softness in the first 24 hours after baking. After 2 days storage the firmness has already markedly increased. There is no suggestion or indication whether the use of the combination of the two enzymes leads to a shelf-life of the bread beyond 7 days.

There is still a need for a process on commercial industrial scale for producing bread having a relatively long shelf life of at least 7 days and satisfactory organoleptic and physical properties (such as a bread without unacceptable decreasing crumb elasticity, softness and/or freshness within a period of at least 7 days) and preferably without using added emulsifiers and added thickening agents or increasing the amount of conventional additives (such as fats and/or sugar), above the conventionally used levels in the commercial production of bread

SUMMARY OF THE INVENTION

After extensive experiments it has now been found that a commercial process for producing bread can be effected by the conjoint use of a complex enzyme mixture and one or more selected enzymes in the bread dough or a bread dough ingredient.

Accordingly the present invention relates to a process for producing bread, said process being suitable for obtaining a bread having a shelf-life of at least seven days, the process comprising providing a dough based upon a flour, wherein to the dough or to a dough ingredient a complex enzyme mixture is added, said complex enzyme mixture comprising, a maltogenic amylase, at least one other amylase, a phospholipase and a protease and at least one additional enzyme selected from the group consisting of amylo-glucosidases, cellulases, glucose-oxidases, glycolipases, hemicellulases, lipases, mannases, peptidases, pentosanases, hexose oxidases, transglutaminases and xylanases.

The mixing of the dough ingredients can be done by any means known in the art, e.g. by a straight dough method, as is often applied in Europe or a sponge and dough method, as is commonly applied in the USA. Very good results have been achieved with a sponge and dough method. Herein first part of the ingredients is mixed to form a first dough, which is known as the sponge and thereafter the rest of the ingredients are added to the sponge and mixed to form the final dough that is to be baked. It has been found that a bread baked from a dough that is prepared by such a sponge and dough method has a particularly fine structure, a soft texture and a very well appreciated taste.

The dough can be baked under conditions known in the art. A process according to the invention is in principle suitable for any kind of bread and in particular for yeast fermented bread, such as white bread. Usually the dough is based upon flour—preferably wheat flour—water, yeast and optionally additives typically used in the art.

It has been found that the present invention provides a process for producing bread with a relatively long shelf-life, typically of from 7 to 30 days, preferably 15–30 days. The shelf-life of inter alia a wheat based bread as used herein is defined as the period during which, starting from the manufacture of the bread, the compressibility as measured by a Stevens texture analyser of a bread is 1100 or less, preferably 800 or less, more preferably less than 700 units, when the bread is stored under ambient conditions (20° C.). At a higher value the bread is not soft enough anymore and past its shelf-life. More details about the Stevens analyser are presented in the examples. It is noted that for a broad based upon a different cereal, e.g. a rye-based bread, the shelf-life may be defined on the basis of a different maximum value for the compressibility. Acceptable values for a specific kind of bread are known in the art.

It has been found that the invention allows the manufacture of a bread with a satisfactory loaf volume. For example, a typical loaf of bread (e.g. white wheat bread) with a mass of about 700 g rises to a volume of at least about 3200 ml at the end of the baking process. In other terms, a typical loaf of bread has a specific volume of at least 4.5. Preferably the specific volume is in the range of 5.5 to 7.5 ml/g.

Other desirable quality aspects, such as the structure (which should not be too course, preferably fine or silky) resilience and organoleptic properties, are usually expressed in panel scores.

DETAILED DESCRIPTION OF THE INVENTION

Such a bread can be produced according to the invention with a dough that is essentially free from added emulsifiers, including from phospholipids, e.g. lecithin, and/or free from added thickening agents and/or having no increased levels of fat.

The enzymes in the complex enzyme mixture and the selected additional enzyme(s) are preferably of microbial origin.

Preferred examples of the amylase (other than the maltogenic amylase) are amylases of *Aspergillus oryzea* and of *Aspergillus niger*. Also suitable are bacterial amylase e.g., originating from *Bacillus amyloliquefaciens, Bacillus licheniformis, Bacillus thermoproteolyticus, Bacillus stearothermophilus*. A preferred bacterial amylase is amylase of *Bacillus subtilis.*

A preferred maltogenic amylase is maltogenic amylase of *Bacillus stearothermophilus.*

Suitable xylanases include fungal xylanases, such as xylanase of *Aspergillus oryzae, Aspergillus awamori, Trichoderma viride, Trichoderma reesei, Aspergillus foetidus*, and—preferably—of *Aspergillus niger.*

Bacterial xylanase, e.g. of: *Bacillus amyloliquefaciens, Bacillus licheniformis* and *Bacillus subtillus* are also suitable, of which *Bacillus subtillus* is preferred.

A preferred mannase is mannase of *Aspergillus niger.*

Suitable sources for phospholipase and other lipases include *Aspergillus niger, Rhizopus oryzae, Rhizopus oryzae, Rhizopus delemar, Candida, Trichoderma reesei*. Very good results have been achieved with phospholipase and optionally lipase of *Aspergilus oryzea.*

Examples of pentosanases are those originating from *Humicola faecalis* and preferably from *Trichoderma reesei.*

Suitable cellulases include cellulases of *Trichoderma reesei, Trichoderma viride, Aspergillus oryzae* and *Aspergillus niger* of which *Aspergillus niger* is preferred.

Protease (including peptidase) may for example be obtained from *Trichoderma reesei, Rhizopus oryzae* or *Aspergillus oryzae*. A preferred source for protease (including peptidase) is *Aspergillus niger.*

Glucose oxidase may for example be obtained from *Penicillum chrysogenum*. A preferred source is *Aspergillus niger.*

Examples of amyloglucosidases are amyloglucosidases from *Rhizopus oryzae, Rhizopus delemar* and *Aspergillus niger*, of which *Apergillus niger* is preferred.

Some of these enzymes have in isolation been proposed as bread improving agents, but it has been found in experiments that the combined action of the constituent enzymes of the complex mixture and the selected additional enzyme(s) is a kind of interlocking action, i.e. deletion of a constituent enzyme of the complex mixture has a negative influence on the combination of achieved effects, viz. extended shelf life concomitant with excellent bread quality and good organoleptic and physical properties. It has also been found that by the choice of enzymes, the processibility of the bread can be improved. For example it has been found that by using protease, in particular peptidase the dough handling is improved (in particular improved rheological properties), besides a positive effect on the shelf-life.

Addition of one and preferably of more of the selected additional enzymes to the complex enzyme mixture has been found to have a very beneficial effect on the shelf life of the produced bread, whilst retaining the excellent bread quality.

Very good results have been achieved with a mixture comprising as additional enzyme or enzymes at least xylanase and/or hemicellulase. It is highly preferred to use as additional enzymes at least xylanase, mannase, glucose oxidase, cellulase and pentosanase.

Hexose oxidase, transglutaminase or a combination thereof have been found to have a beneficial effect in a process, dough, or enzyme mixture according to the invention, for example with respect to the dough processing properties. It has further been found that these enzymes can be used to obtain a bread with a highly satisfactory fine to silky structure. These enzymes have also been found to have a positive effect on the shelf-life of a bread.

With regard to the respective amounts of the constituent enzymes of the complex enzyme mixture and of the selected additional enzyme(s), it is observed that in general the enzyme manufacturers and suppliers indicate preferred ranges to achieve optimal effects for the required food use of the enzyme. The complex enzyme mixture can e.g. commercially be obtained at Innovative Baking Technology BV (IBT), Made, The Netherlands. The total amount of complex enzyme mixture and selected additional enzyme(s) to be used in the process according to the present invention may vary on the circumstances, such as the intended result and the specific activity of the various enzymes in a specific enzyme mixture. Effective and optimal amounts of the various enzymes can be determined by routine experiments, by the man skilled in the art e.g. on hand of the data provided by the supplier or on the basis of common general knowledge. If for example for the complex enzyme mixture and the additional enzyme(s) products of IBT are used, then generally the total amount of the complex enzyme mixture and the additional enzyme(s) is from 200 parts per million (ppm) to 1000 ppm, preferably from 250 ppm to 400 ppm based on the weight of the flour.

Although in the process according to the present invention fat can be added, it is preferred to add no fat. The term "fat", is used herein to describe fatty substances such as fatty acids and fatty acid esters of vegetable or animal origin that are solid at 20° C. An example of a suitable fat is lard. Fats may be added as such or in the form of a shortening, i.e. a composition comprising fat (which may be modified) and optionally additives. It is stressed that oil (typically of vegetable or animal origin), which may be added in a typical concentration of up to 3 wt % based on the weight of the dough to improve the processing of the dough, is not regarded as added fat. Suitable examples of such oils are soy bean oil, sunflower oil, rape seed oil etc. It is has been found that addition of such oil does not tend to affect the shelf-life to a significant extent.

The fat level in a particular product may thus vary, depending upon the type of product In general the amount of fat in a conventional product will be less than 20%. Good results, in terms of a long shelf-life and a good bite, have been obtained with a process according to the invention wherein a bread is made with less than 6% fat. A process according to the invention has been found very suitable for making a bread comprising less than 1% fat. In fact, it has been found possible to manufacture a bread with a shelf-life of at least 7 days, preferably at least 15 days without adding any fat.

The present invention therefore provides a commercial process to produce bread which is essentially free from added emulsifiers, thickening agents and/or fat and which yet has an unprecedented shelf life of at least 7 days to 30 days. By the expression "essentially free of a specific component" (e.g. emulsifier or fat) is understood throughout this specification and the appended claims that addition of an extra amount of that component (e.g. emulsifier or fat) is not required beyond the amount that is naturally present in the flour used to make the dough. It is stressed that for practical reasons in a process, a broad dough, a bread or a bread improver composition according to the present invention an effective amount of fat, thickening agent, and/or emulsifier may be used. Examples of suitable emulsifiers include mono- and/or diglycerides, diacetyl tartaric acid ester of mono- and/or diglycerides and the like. However, the invention particularly and preferably relates to a process, a broad dough, a bread and a bread improver composition in which no emulsifiers are added.

The strong positive action of the complex enzyme mixture and the selected additional enzyme(s) in the process of manufacturing bread according to the present invention can be such that the shelf life of the bread is increased to such an extent that the general quality of the broad is still good according to the official standards, but the flavour and/or aroma of the bread is diminishing. To remedy this, an effective amount of a bread flavouring agent or a bread flavour enhancing agent may be added to the dough or to a dough ingredient. Also bread flavouring agent precursors may be used or a mixture of bread flavouring agents and/or bread flavour enhancing agents and/or their respective precursors. Suitable examples of such agents include furanones (e.g. 4,5-Dimethyl-3-hydroxy-2,5-dihydrofuran-2-one), alcohols and iso-alcohols, lactones, (e.g. gamma-nonalacton), phenolic esters, esters of fatty acids, in particular esters of lower fatty acids (e.g. having up to eight carbon atoms, preferably four to eight carbon atoms), diacetyl, 4-cis-heptanal and its precursors and small amounts of nitrogen and sulphur containing compounds. A preferred mixture is the bread flavouring agent Dorome 25™ (ex Innovating Food Technology BV (IFT), Made, The Netherlands). If Dorome 25 is used, effective amounts of this bread flavouring agent are from 100 ppm to 2000 ppm, preferably from 200 ppm to 500 ppm, based on the weight of the flour.

Bread flavouring agents that may be used are for example those described in J. Agric. Food Chem 1998, 46, 2721–2726 and in Cereal Chem 74(2):91–97 and agents known in the art.

The present invention also relates to a bread dough, which comprises a complex enzyme mixture such as specified above.

The enzymes in the complex enzyme mixture and the selected additional enzymes preferably are of microbial origin. With regard to the respective amounts of the constituent enzymes of the complex enzyme mixture and the total amount of the complex enzyme mixture and the selected additional enzyme(s), the same observations as made herebefore with regard to the process of producing the bread according to the present invention apply The bread dough according to the present invention generally comprises a cereal meal or flour, such as wheat flour, but may also comprise other types of flour, such as corn flour, rye flour and the like. The dough further comprises water and yeast and a bread improver composition according to the present invention. The dough may also comprise fat or shortening, but preferably the dough does not contain added fat (or only such an amount of fat as is necessary for its mechanical manufacture), salt, sugar and other conventional dough ingredients, such as proteins, eggs, oxidants, amino acids, preservatives and the like. The dough may also be in frozen form.

The bread dough according to the present invention may also comprise an effective amount of a bread flavouring agent or a bread flavour enhancing agent and/or precursors of these agents, as indicated above.

The bread dough according to the present invention in preferably essentially free from emulsifiers. Preferably the dough is essentially free from thickening agents. A highly preferred dough has no increased levels of fat and/or sugar, compared to conventional bread dough.

The present invention also relates to a process for producing bread in which a bread dough according to the present invention is formed and baked.

The present invention further relates to a bread having a shelf-life of at least seven days, preferably of more than 7 days. In particular the present invention also relates to a bread having a shelf-life of 11–30 days, more in particular of 15–22 days.

The shelf-life is defied herein as the period between baking of the broad and the moment at which the crumb firmness as measured by a Stevens texture analyzer reaches a value of 1100, when the bread is stored at 20° C. Preferably the bread has a crumb firmness after 7 days of 800 or less, more preferably of 700 or less.

In particular the invention relates to a bread, essentially free of added emulsifiers, having a shelf-life of at least 7 days.

A bread according to the invention preferably comprises an effective amount of a bread flavouring agent or a bread flavour enhancing agent, more preferably such as indicated above.

Preferably a bread according to the invention is does not contain added fat or added thickening agent.

The bread is preferably wheat based and may contain other cereals, e.g., rye and/or corn, and is usually a yeast fermented bread. A preferred bread according to the invention is a wheat based white bread. The bread may have any form. Particular good results have been obtained with buns, (rolls) and loaves, of which loaves are preferred.

A bread according to the invention has been found to have a satisfactory structure and volume. Preferably the specific volume is in the range of 5.5 to 7.5 ml/g.

The present invention also relates to a bread improver composition which comprises a complex enzyme mixture comprising a maltogenic amylase, at least one other amylase, a phospholipase, a protease, preferably a peptidase, and at least one additional enzyme selected from the group consisting of amylo-glucosidases, cellulases, glucose-oxidases, glycolipases, hemicellulases, lipases, mannases, pentosanases, proteases—other than peptidases—and xylanases. The respective amounts of the constituent enzymes of the complex enzyme mixture and of the selected additional enzyme(s), as well as the total amount of enzymes are the same as those in the process according to the present invention for producing bread and for the bread dough according to the present invention.

A bread improver composition according to the invention may further comprise a carrier, i.e. an component that has no substantial enzyme activity. Suitable carriers are known in the art and include inter alia sugar, flour, starch, dry milk constituents and salts.

The enzymes in the complex enzyme mixture and the selected additional enzymes of the bread improver composition preferably are of microbial origin.

The bread improver composition may also comprise an effective amount of a bread flavouring agent or a bread flavour enhancing agent or a precursor of these agents, such as those indicated above, e.g. in amounts as indicated above.

The bread improver composition according to the present invention preferably is in the form of a powder and its particle size distribution preferably is such that more than 80% by weight has a particle size of from 50 to 500 micrometer. The bread improver composition in powder form may be prepared by manners known per se, such as spraying the enzymes onto an innocuous carrier material.

The bread improver composition may also comprise other conventional dough ingredients, such as proteins, amino acids, salt, preservatives, oxidants, pH-control agents, antimycotic agents and mixtures thereof.

The present invention is now further demonstrated by the following examples.

EXAMPLES 1–5

For the manufacture of bread a so-called American Sponge & Dough method was used according to recipe and processing which is specified below.

TABLE 1

USA Sponge & dough

| Recipe ingredients | Sponge wt % | Dough wt % |
|---|---|---|
| USA flour | 58 | 42 |
| Water | 35 | 23 |
| Fermipan Brown | 2 | 1 |
| Ammonium sulphate | 0.02 | — |
| Ascorbic acid | 0.0025 | — |
| Salt | — | 2 |
| HFCS (78% solids, 85% fructose) | — | 15 |
| Oil | — | 3 |
| Rotox | — | 0.05 |
| Enzyme mix (varying composition) | — | varying (see below) |

The sponge was prepared by mixing the above identified components in the specified proportions. The resultant sponge was slowly mixed for 3 min fast for 2 min in a Spiral mixer at a temperature of 24° C.

Thereafter additional ingredients were added to the sponge to obtain a dough as specified in the table above. The dough was mixed at high speed in a Morton-Z-blade mixer at a temperature of 26° C.

The dough was put through a short extruder (meat mill).

700 g of dough was rounded up softly by hand and then proofed for 6 min. at room temperature. The dough was then moulded with a "Mono" (Walls; 5 Pressure belt; 8 Conductors; 11).

The moulded dough was then subject to a final proofing of 70 min. at 40° C. and 80% R.H, whereafter it was baked for 21 min in an oven having a top temperature of 200° C. and a floor temperature of 250° C.

After cooling to room temperature the loaves were stored in polyethylene bags at room temperature.

A shock test was carried out with a modified JEL shaking machine (ex J. Engelsman, Ludwigshafen, Germany) for 5 seconds. The results of the shock test (proofing tolerance) were assessed by an expert panel using the following rating: 1=very bad, 2=bad, 3=very moderate, 4=moderate, 5=hardly acceptable, 6=acceptable, 7=fair, 8=good, 9=very good and 10=excellent.

The softness of the bread was assessed by an expert panel, using the same rating as for the proofing tolerance.

The crumb firmness (or softness) was measured using a modified Stevens Texture Analyser. Two slices of 2 cm thickness from the centre of each loaf were tested by means of the texture analyser using a probe of 1.5 inch diameter, a compression depth of 5 mm (25%) and at a rate of compression of 0.5 mm/sec.

In all Examples 1–5, 200 ppm of a complex enzyme mixture (indicated as Capzyme 252™, IBT, Made, The Netherlands) was used, providing 40 ppm maltogenic alpha-amylase, 10 ppm fungal amylase, 45 ppm phospholipase, 30 ppm protease (peptidase) and 75 ppm carrier (flour) to the dough.

In Example 2 additionally 100 ppm IBT Softase B™ (IBT) were used This product essentially consisted of 30 wt % bacterial amylase and 70 wt % carrier.

In Example 3 additionally 100 ppm IBT Softase B Super™; (IBT) were added, which consisted of 30 wt % bacterial amylase, 30 wt % xylanase and 40 wt % carrier.

In Example 4 additionally 100 ppm of IBT Doughase™ (ex IBT) were used, which product consisted of 30 wt % xylanase and 70 wt % carrier.

In Example 5 additionally 10 ppm xylanase, 20 ppm bacterial amylase, 5 ppm mannase, 20 ppm glucose oxidase, 10 ppm cellulase, 5 ppm pentosanase and 80 ppm carrier (provided as 150 ppm of a mixture of IBT Softase XXL (Trade Mark); ex IBT, Made, The Netherlands) were used.

The results are summarized in the Table 2. From these results it is clear that in selecting more than one additional enzyme according to the present invention the results are accordingly better.

EXAMPLES 6–8

Bread was prepared as described in Example 1, but now a bread flavouring agent (Dorome 25™, ex IFT) was added in amounts of 200 ppm, 600 ppm and 1200 ppm respectively. Also the aroma development of the bread upon storage in polyethylene bags at room temperature was assessed by an expert panel, using the following rating: 2=strong stale aroma, 3=strong off taste/stale 4=off taste/stale, 5=off taste/spongy aroma, 6=spongy aroma, 7=lightly stale or slightly spongy aroma 8=rather good like fresh bread and 9=aroma like fresh bread (=3 days)

The physical properties of the bread upon storage were as reported for example 5, whereas the development of the type of aroma and its assessment by the expert panel are summarized in Table 3.

EXAMPLES 9–12

Breads were baked as described for Example 1, but with different enzyme mixes. For each of the breads an enzyme mix comprising only three out of the four enzymes of the IBT-base of Example 1 (maltogenic alpha-amylase, fungal amylase, phospholipase and protease) was used. Table 4 shows the results for each different combination of enzymes.

TABLE 2

Baking tests with example 1, 2, 3, 4 and 5

|  | Eample 1 | Example 2 | Example 3 | Example 4 | Example 5 |
|---|---|---|---|---|---|
| Capzyme 252 | 200 ppm | 200 ppm | 200 ppm | 200 ppm | 200 ppm |
| IBT Softase B |  | 100 ppm |  |  |  |
| IBT Softase super |  |  | 100 ppm |  |  |
| IBT Doughase X |  |  |  | 100 ppm |  |
| IBT Softase XXL |  |  |  |  | 150 ppm |
| Dough handling (by expert panel) | good | good | good | good | very good |
| Proofing tolerance # (with shock test) | 6 | 6 | 8 | 8 | 10 |
| Loaf volume in ml | 3400 cc | 3450 cc | 3850 cc | 3800 cc | 3950 cc |
| Texture | irregular open | irregular coarse | regular open | regular fine | regular silky/fine |
| Softness assesment by panel |  |  |  |  |  |
| day 3 | 8 | 9** | 10** | 9 | 10 |
| day 7 | 5 | 7** | 8 | 6 | 10 |
| day 11 | 3 | 6 | 7 | 4 | 9 |
| day 16 | 1 | 4 | 5 | 2 | 8 |
| day 22 | 1 | 3 | 4 | 1 | 8 |
| day 30 | 1 | 3 | 4 | 1 | 7 |
| Crumb firmness (g) by texture analyzer |  |  |  |  |  |
| day 3 | 420 | 370 | 340 | 365 | 310 |
| day 7 | 760 | 580 | 420 | 660 | 320 |
| day 11 | 1190 | 670 | 580 | 970 | 380 |
| day 16 | 1980 | 1010 | 810 | 1300 | 440 |
| day 22 | 2050 | 1190 | 990 | 1970 | 510 |
| day 30 | 2030 | 1270 | 990 | 2050 | 620 |

**poor resilience.
*crumb is braking
Example 1 = Capzyme 252 containing maltogenic amylase, fungal amylase, (phospho) lipase, protease
Example 2 = Capzyme 252 + IBT Softase B. containing bacterial amylase
Example 3 = Capzyme 252 + IBT Softase B super containing bacterial amylase + xylanase.
Example 4 = Capzyme 252 + IBT Doughase X containing xylanase
Example 5 = Capzyme 252 + IBT Softase XXL containing xylanase, bact. Amylase, manaase, glucose oxidase, cellulase, pentosanase.

TABLE 3

Baking tests with examples 6–8

|  |  | Example 5 | Example 6 | Example 7 | Example 8 |
|---|---|---|---|---|---|
| Capzyme 252s |  | 200 ppm | 200 ppm | 200 ppm | 200 ppm |
| IBT Softase XXL |  | 150 ppm | 150 ppm | 150 ppm | 150 ppm |
| IBT Dorome 25 |  |  | 200 ppm | 600 ppm | 1200 ppm |
| Aroma* | day 3 | propionate | neutral | slightly spongy | strong flavour |
|  | day 7 | propionate + "stale" aroma | rather neutral (fresh bread) | slightly spongy | strong flavour |
|  | day 11 | propionate + "stale" aroma | rather neutral (fresh bread) | neutral (fresh bread) | rather strong flavour |
|  | day 16 | "stale" aroma | slightly "stale" aroma | neutral (fresh bread) | spongy aroma |
|  | day 22 | "stale" aroma (strong) | slightly "stale" aroma | rather neutral | spongy aroma |
|  | day 30 | "stale" aroma (strong) | slightly "stale" aroma | rather neutral | light spongy aroma |
| Aroma** | day 3 | 5 | 8 | 7 | 4 |
|  | day 7 | 4 | 9 | 7 | 4 |
|  | day 11 | 3 | 9 | 8 | 5 |
|  | day 16 | 2 | 7 | 8 | 6 |
|  | day 22 | 2 | 7 | 8 | 6 |
|  | day 30 | 2 | 7 | 8 | 7 |

*description by expert panel
**assessment by panel,
Example 5 = Capzyme 252 + IBT Softase XXL
Example 6 = same as example 5 + 200 ppm Dorome 25
Example 7 = same as example 5 + 600 ppm Dorome 25
Example 8 = same as example 5 + 1200 ppm Dorome 25

TABLE 4

Baking tests with Examples 9, 10, 11, 12

| | Example 1 | Example 9 | Example 10 | Example 11 | Example 12 |
|---|---|---|---|---|---|
| Capzyme 252 (all enzymes) | 200 ppm | | | | |
| Capzyme 252, but no amylase | | 200 ppm | | | |
| Capzyme 252, but no phospholipase | | | 200 ppm | | |
| Capzyme 252, but no protease (peptidase) | | | | 200 ppm | |
| Capzyme 252, but no malto-genic amylase | | | | | 200 ppm |
| Dough handling (expert panel) | good | good | lightly sticky | bucky | good |
| Proofing tolerance # (with shock test) | 6 | 6 | 3 (rejected) | 5 | 6 |
| Loaf volume in ml | 3400 | rejected (2960) | rejected (2840) | 3200 | 3400 |
| Texture | irregular open | rejected very coarse | rejected very coarse | coarse | rather coarse |
| Softness | | | | | |
| assessment by panel | | n/a | n/a | | |
| day 3 | 8 | | | 7 | 5 |
| day 7 | 5 | | | 4 | 1 |
| day 11 | 3 | | | 3 | 1 |
| day 16 | 1 | | | 1 | 1 |
| day 22 | 1 | | | 1 | 1 |
| day 30 | 1 | | | 1 | 1 |
| Crumb firmness | | | | | |
| (g) by texture analyzer | | n/a | n/a | | |
| day 3 | 420 | | | 500 | 790 |
| day 7 | 760 | | | 960 | 1980 |
| day 11 | 1190 | | | 1350 | >2200 |
| day 16 | 1980 | | | 1890 | >2200 |
| day 22 | 2050 | | | 2100 | >2200 |
| day 30 | 2030 | | | 2190 | >2200 |

**poor resilience.
Without amylase not acceptable: low volume
Without maltogenic not acceptable softness properties
Without (phospho) lipase ant acceptable: coarse crumb texture, low volume
Without protease (peptidase) not acceptable: difficult to handle dough

What is claimed is:

1. A process for producing bread, the process being suitable for obtaining a bread having a shelf-life of at least fifteen days, the process comprising:
    providing a dough based upon a flour;
    adding to the dough or to a dough ingredient a complex enzyme mixture, said complex enzyme mixture comprising a maltogenic amylase, at least one other amylase, a phospholipase, a protease and at a lipase from *Rhizopus Oryzae*, in an amount sufficient to provide a bread having a shelf-life of at least 15 days.

2. A process according to claim 1, in which the total amount of the complex enzyme mixture and the additional enzymes is from 100 parts per million (ppm) to 1000 ppm, based on the weight of the flour.

3. A process according to claim 1, wherein the total amount of the complex enzyme mixture and the additional enzymes is from 250 ppm to 400 ppm, based on the weight of the flour.

4. A process according to claim 1, in which an effective amount of a bread flavouring agent or a bread flavour enhancing agent is added to the dough or to the dough ingredient.

5. A process according to claim 1, in which the bread is essentially free from added emulsifiers.

6. A process according to claim 1, in which the bread is essentially free from added fat.

7. A process according to claim 1, in which the bread is essentially free from added thickening agents.

8. A process for producing bread, the process being suitable for obtaining a bread having a shelf-life of at least fifteen days, the process comprising:
    providing a dough based upon a flour,
    adding to the dough or to a dough ingredient a complex enzyme mixture, said complex enzyme mixture comprising a maltogenic amylase, at least one other amylase, a phospholipase, a peptidase and a lipase from *Rhizopus Oryzae*, in an amount sufficient to provide a bread having a shelf-life of at least 15 days.

9. A process according to claim 1, wherein a bread with a shelf-life of up to 30 days is obtained.

10. A bread dough comprising a complex enzyme mixture comprising a maltogenic amylase, at least one other amylase, phospholipase, protease and a lipase from *Rhizopus Oryzae*, in an amount sufficient to provide a bread having a shelf-life of at least 15 days.

11. A bread dough according to claim 10, in which the total amount of the complex enzyme mixture and the additional enzymes is from 100 ppm to 1000 ppm, based on the weight of the flour.

12. A bread dough according to claim 10, wherein the total amount of the complex enzyme mixture is from 250 ppm to 400 ppm, based on the weight of the four.

13. A bread dough according to claim 10, comprising an effective amount of a bread flavouring agent or a bread flavour enhancing agent.

14. A bread dough according to claim 10, in which the bread is essentially free from added emulsifiers.

15. A bread dough according to claim 10, in which the bread is essentially free from added fat.

16. A bread dough according to claim 10, in which the bread is essentially free from added sugar.

17. A bread dough according to claim 10, in which the bread is essentially free from added thickening agents.

18. A bread dough comprising a complex enzyme mixture comprising, maltogenic amylase, at least one other amylase, phospholipase, a peptidase and a lipase from *Rhizopus Oryzae*, in an amount sufficient to provide a bread having a shelf-life of at least 15 days.

19. A process for producing bread, which comprises forming a dough as claimed in claim 10 and baking the dough.

20. A bread improver composition comprising a complex enzyme mixture comprising a maltogenic amylase, at least one other amylase, a phospholipase, a protease, and a lipase from *Rhizopus Oryzae*, in an amount sufficient to provide a bread having a shelf-life of at least 15 days.

21. A bread improver composition according to claim 20, comprising an effective amount of a bread flavouring agent or a bread flavour enhancing agent.

22. A bread improver composition comprising a complex enzyme mixture comprising a maltogenic amylase, at least one other amylase, a phospholipase, a peptidase, and a lipase from *Rhizopus Oryzae*, in an amount sufficient to provide a bread having a shelf-life of at least 15 days.

23. A process according to claim 1, wherein the enzyme mixture comprises at least one additional enzyme selected from the group consisting of amylo-glucosidases, cellulases, glucose-oxidases, glycolipases, hemicellulases, lipases other than lipase from *Rhizopus oryzae*, mannases, peptidases, pentosanases and xylanases.

24. A process according to claim 8, wherein the enzyme mixture comprises at least one additional enzyme selected from the group consisting of amylo-glucosidases, cellulases, glucose-oxidases, glycolipases, hemicellulases, lipases other than lipase from *Rhizopus oryzae*, mannases, proteases other than peptidase, pentosanases and xylanases.

25. A bread dough according to claim 10, wherein the enzyme mixture comprises at least one additional enzyme selected from the group consisting of amylo-glucosidases, cellulases, glucose-oxidases, glycolipases, hemicellulases, lipases other than lipase from *Rhizopus oryzae*, mannases, peptidases, pentosanases and xylanases.

26. A bread dough according to claim 18, wherein the enzyme mixture comprises at least one additional enzyme selected from the group consisting of amylo-glucosidases, cellulases, glucose-oxidases, glycolipases, hemicellulases, lipases other than lipase from *Rhizopus oryzae*, mannases, proteases other than peptidase, pentosanases and xylanases.

27. A bread improver composition according to claim 20, wherein the enzyme mixture comprises at least one additional enzyme selected from the group consisting of amylo-glucosidases, cellulases, glucose-oxidases, glycolipases, hemicellulases, lipases other than lipase from *Rhizopus oryzae*, mannases, peptidases, pentosanases and xylanases.

28. A bread improver composition according to claim 22, wherein the enzyme mixture comprises at least one additional enzyme selected from the group consisting of amylo-glucosidases, cellulases, glucose-oxidases, glycolipases, hemicellulases, lipases other than lipase from *Rhizopus oryzae*, mannases, proteases, pentosanases and xylanases.

29. A bread having a shelf-life of at least 15 days obtained by the process comprising:
   providing a dough based upon a flour;
   adding to the dough or to a dough ingredient a complex enzyme mixture in an amount sufficient to provide said bread having a shelf-life of at least 15 days, said complex enzyme mixture comprising a maltogenic amylase, at least one other amylase, a phospholipase, a lipase from *Rhizopus oryzae* and an additional enzyme selected from the group consisting of a protease and a peptidase.

30. A bread according to claim 29, essentially free of added emulsifiers.

31. A bread according to claim 29, essentially free of added fat.

32. A bread according to claim 31, wherein the bread contains less than 6% total fat.

33. A bread according to claim 29, essentially free of added thickening agents.

34. A bread according to claim 29, wherein the bread has a fine texture.

35. A bread according to claim 34, wherein the bread has a specific volume of at least about 5.5.

36. A bread according to claim 29, wherein the shelf-life is at least 22 days.

37. A bread according to claim 29, wherein the shelf-life is up to 30 days.

38. A bread according to claim 29, wherein said additional enzyme is a protease.

39. A bread according to claim 29, wherein said additional enzyme is a peptidase.

* * * * *